May 8, 1951 L. H. ORPIN 2,552,013

PULSE DURATION DISCRIMINATOR

Filed April 22, 1947 5 Sheets-Sheet 1

Inventor
L. H. Orpin,
By
Neil W. Preston,
his Attorney

May 8, 1951 L. H. ORPIN 2,552,013

PULSE DURATION DISCRIMINATOR

Filed April 22, 1947 5 Sheets-Sheet 2

Inventor
L. H. Orpin,
By
Neil W. Preston,
his Attorney

May 8, 1951 L. H. ORPIN 2,552,013

PULSE DURATION DISCRIMINATOR

Filed April 22, 1947 5 Sheets-Sheet 3

Inventor

L. H. Orpin,

By

Neil W. Preston, his Attorney

May 8, 1951 L. H. ORPIN 2,552,013

PULSE DURATION DISCRIMINATOR

Filed April 22, 1947 5 Sheets-Sheet 4

Inventor

L. H. Orpin,

By Neil W. Preston, his Attorney

May 8, 1951 L. H. ORPIN 2,552,013

PULSE DURATION DISCRIMINATOR

Filed April 22, 1947 5 Sheets-Sheet 5

Inventor
L. H. Orpin,
By Neil D. Preston,
his Attorney

UNITED STATES PATENT OFFICE 2,552,013

PULSE DURATION DISCRIMINATOR

Lionel H. Orpin, Greece, N. Y., assignor to General Railway Signal Company, Rochester, N. Y.

Application April 22, 1947, Serial No. 743,149

18 Claims. (Cl. 177—353)

This invention relates to pulse duration discriminators and more particularly to electronic discriminators capable of accepting or rejecting, that is repeating or not repeating, electrical pulses dependent on their length or duration.

In the prior application of Kendall and Orpin, Ser. No. 672,750, filed May 28, 1946, now abandoned, discriminators capable of performing similar functions have been disclosed and it is contemplated that the discriminator of the present invention will be used in similar systems but has application in many other forms of pulse technique electronic systems. Because the apparatus of the present invention is capable of determining the particular circuit over which an electrical pulse shall flow, depending upon its length, the system of the present invention may also be considered to be a switching system.

One of the objects and purposes of the present invention resides in the construction of a discriminator which is very critical in its ability to interpret the duration of a pulse, or if desired the amplitude of a pulse.

Another object of the present invention resides in the construction of a discriminator which is very critical in its ability to interpret the duration of a pulse, or if desired the amplitude of a pulse, and to direct such a pulse to a particular circuit in a network.

Another object of the present invention resides in the provision of apparatus which is capable of rejecting a pulse when it is either too short or too long and to carry out such rejection function without resorting to delay circuits such as have, for instance, been used in the prior application above-mentioned.

Still another object of this invention comprises the provision of means performing an interlocking function between electronic tubes which permits only one of a plurality of such tubes to conduct current at any one time.

More specifically it is proposed in accordance with the present invention to provide means for changing a pulse of a particular duration to a pulse of commensurate amplitude or height. Thereafter the converted pulse may be conducted to an amplitude discriminator comprising one or more critically adjusted amplifiers or one or more multivibrators, each of which will respond only if the pulse applied thereto is of predetermined or greater amplitude and each successive one adjusted to respond only to pulses of successively greater amplitude. In the case of the multivibrators, these are utilized in cooperating pairs to control an output circuit, with the multivibrator which is adjusted to respond to pulses of lesser amplitude being adapted to produce an output from the output circuit and the other multivibrator, which is adjusted to respond to pulses of the greater magnitude, being utilized to disable such output circuit or prevent it from functioning if a pulse of such greater magnitude is received. In the case of the critically adjusted amplifiers, it is further proposed to have each of these amplifiers adapted to control a multivibrator which will produce an output pulse of substantially fixed amplitude and duration, to provide a gated amplifier or double input controlled amplifier for each such multivibrator, except the last one of the series, and to allow each such amplifier to respond only if the first of its two associated multivibrators performs a cycle of operation and the other multivibrator does not perform such a cycle of operation, or flip-flop action. In other words, this latter amplifier functions only if the pulse is of a duration great enough to result in the operation of one multivibrator but is not sufficiently long to cause operation of the next critically adjusted amplifier, capable of responding to a slightly longer pulse, and its associated multivibrator.

As another object of the present invention it is proposed to use a double input controlled amplifier or a gated amplifier to supply an input to a gas-type tube which in turn controls some suitable electro-responsive device such as a relay.

A further object of the present invention is to provide means furnishing a constant power output to operate an electro-responsive device from an input of constantly repeated pulses whose repetition frequency may vary between wide limits.

Other objects, purposes and characteristic features of the present invention will in part be more fully pointed out hereinafter and will in part be obvious from the accompanying drawings in which—

Figure 4:
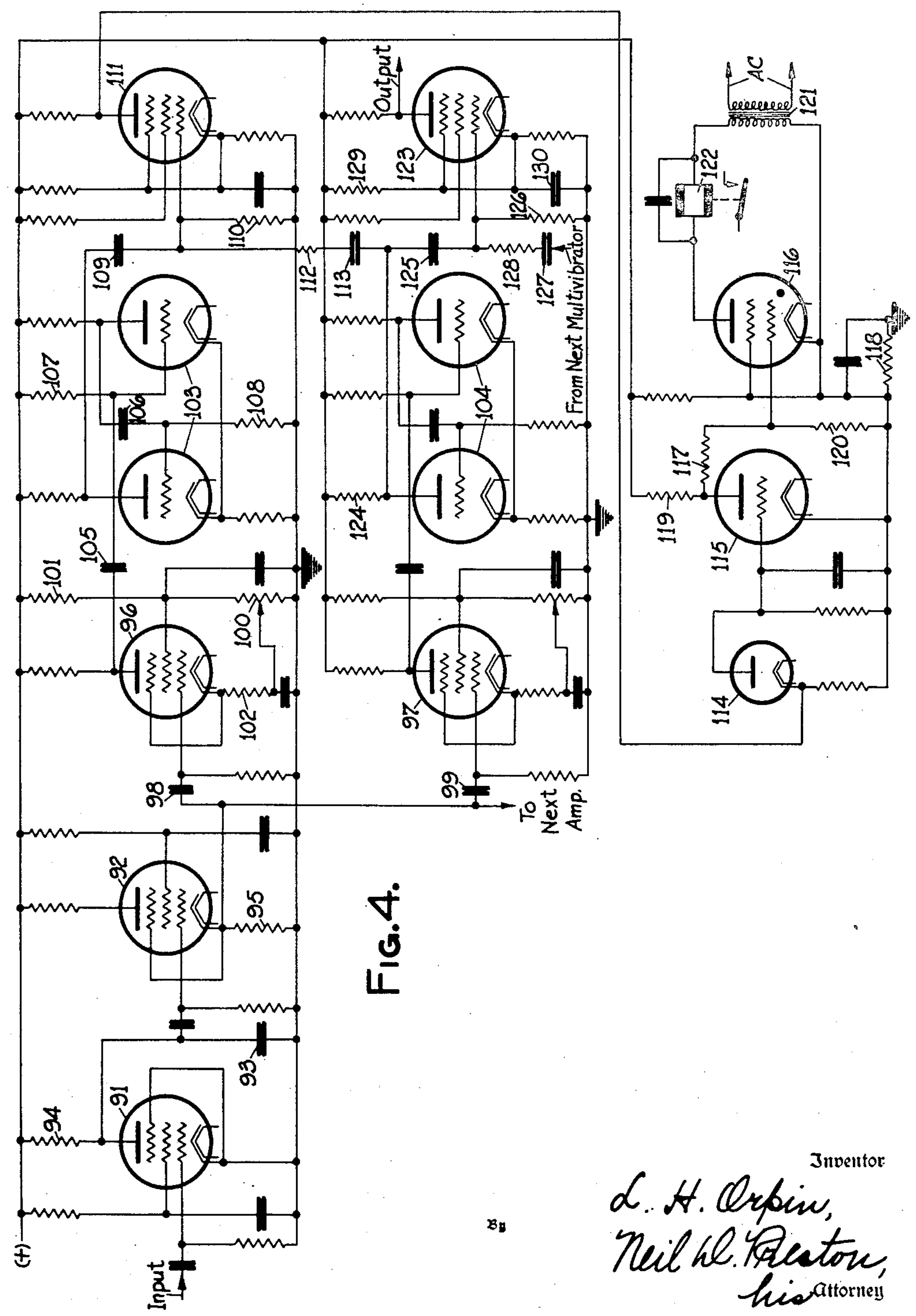
Fig. 4 shows another embodiment of the present invention in circuit diagram form.
Figure 4A:
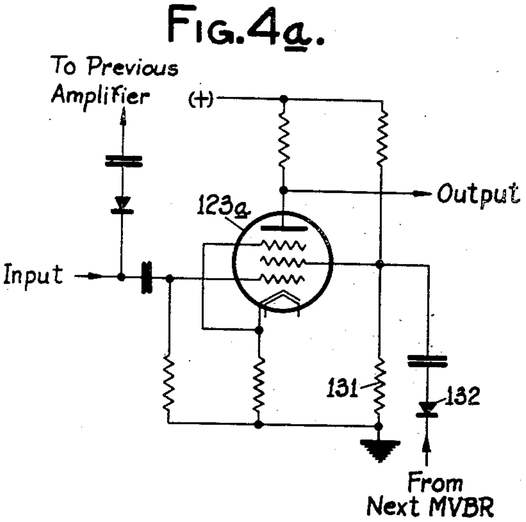
Figure 4B:
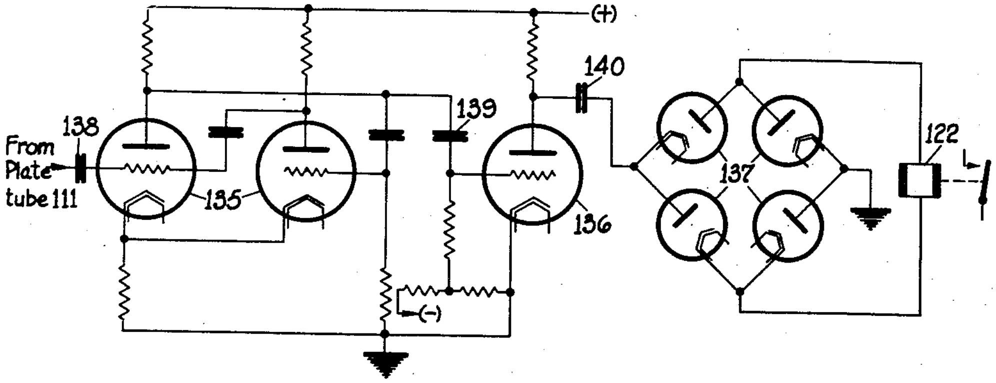
Figure 5:
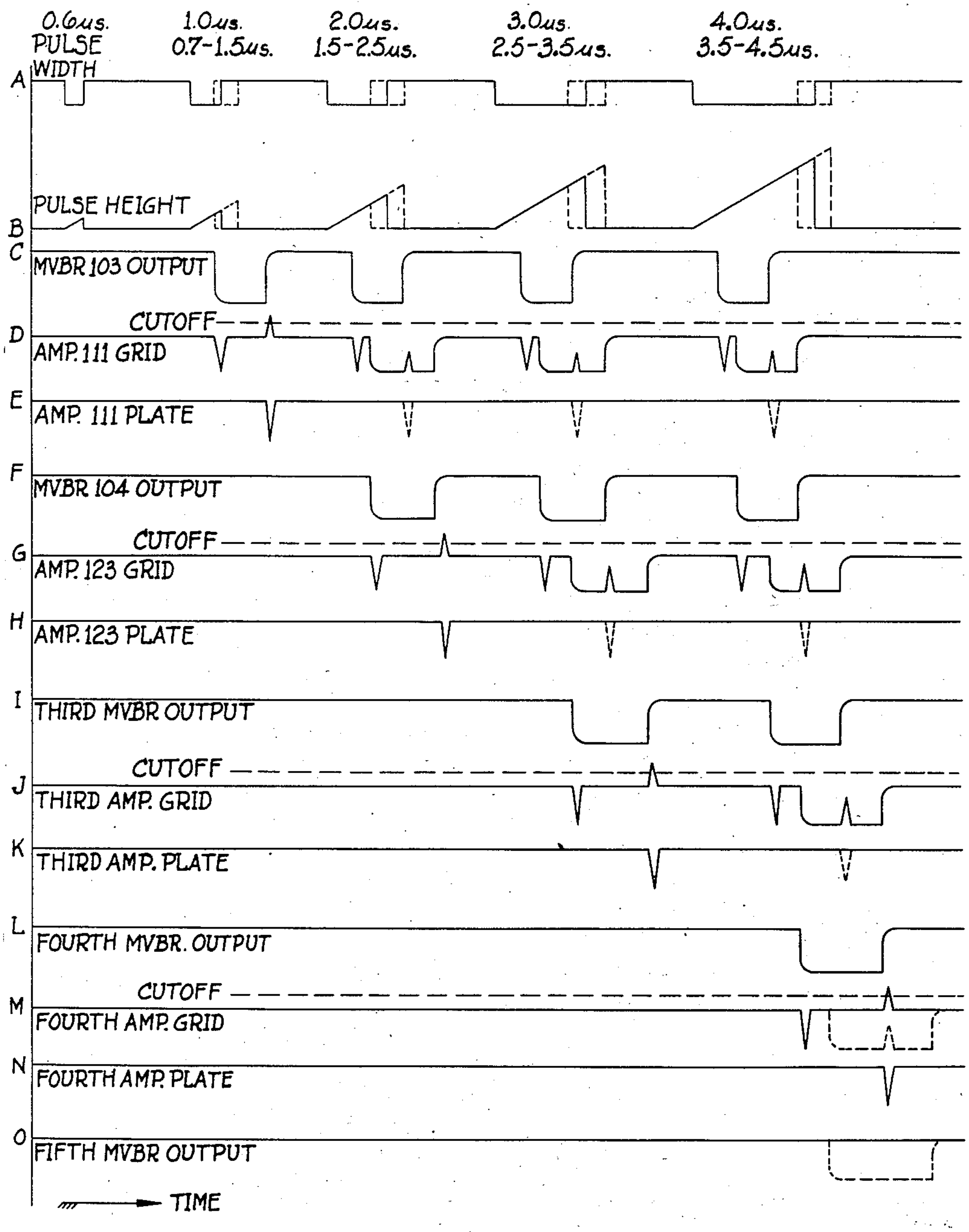

Fig. 4*a* shows a modified element which may be substituted for an element of the Fig. 4 circuit;

Fig. 4*b* shows a modified element which may be substituted for another element of the Fig. 4 circuit; and Fig. 5 illustrates an operational time chart of a system such as shown in Fig. 4 but expanded to include at least four relays capable of being independently controlled by the discriminator.

Figure 1:
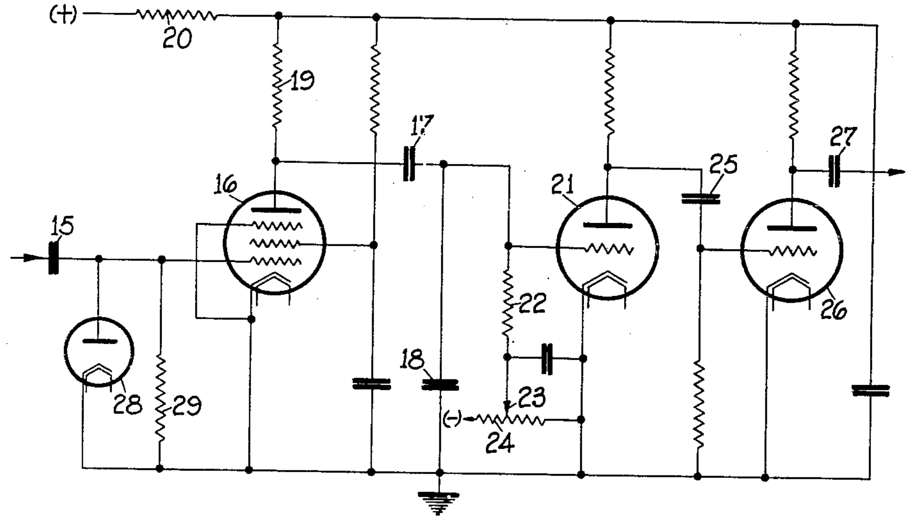
Fig. 1 shows in circuit diagram form one element of this invention.

In Fig. 1 is shown one element of this invention which is responsive only to input pulses whose durations are equal to or greater than a predetermined value. Negative input pulses are coupled through coupling condenser 15 to the control grid of electron tube 16. In this application the first grid in an electron tube starting at the cathode is called the control grid; the second grid, the screen grid; and the third grid, the suppressor grid; the latter being utilized to suppress secondary emission from the plate of the tube. The plate of this tube is connected to ground through condensers 17 and 18 in series and to a positive source of potential through plate resistor 19 and resistor 20 in series. The junction point of condensers 17 and 18 is connected to the grid of electron tube 21 and through resistor 22 to arm 23 of potentiometer 24, whose end terminals are respectively connected to a negative source of potential and ground. The plate of tube 21 is connected through coupling condenser 25 to the the grid of electron tube 26, the output of this latter tube being taken from its plate via coupling condenser 27. The control grid of tube 16 is also connected to ground through the parallel combination of rectifier or diode 28 and resistor 29. The other circuit connections are conventional as shown.

*Operation.*—Tube 16 normally is "on" or conducting due to its grid and cathode being connected to ground, and each negative input pulse applied to its grid through coupling condenser 15 will turn the tube "off," allowing the condenser 18 to start charging up toward the potential of the positive potential source. By making the capacity of condenser 18 small in relation to that of condenser 17, the time constant of its charging is controlled mainly by the resistance of resistor 19 and the value of its own capacitance. When the negative input to the grid of tube 16 ceases, the tube again conducts, with the result that a saw-tooth wave is produced at the junctions of condensers 17 and 18 whose peak amplitude is a measure of the length of time that the grid of tube 16 was negative, or in other words, a measure of the duration of the negative input pulse applied to the grid if the duration of the applied pulse is less than the time constant of resistor 19 and condenser 18. By adjustment of arm 23 of potentiometer 24, amplifier tube 21 can be biased so that it will conduct only for an input saw-tooth whose peak amplitude exceeds a predetermined value. For example, this adjustment can be made such that tube 21 will be turned on only for a saw-tooth whose amplitude corresponds to an input pulse applied to the grid of tube 16 of one microsecond duration or greater. The tube 21 thus provides at its plate a negative output pulse whenever a negative input pulse of desired duration or greater is applied to the grid of tube 16. The purpose of diode 28 is to prevent grid current from flowing in tube 16 and also to prevent positive or negative "overshoots" when the negative impulse is removed. If a positive output pulse is necessary, this negative output pulse may then be coupled via coupling condenser 25 to amplifier-inverter tube 26 and the output taken from the plate of tube 26 via coupling condenser 27. It will be obvious, however, that tube 26 and its associated circuitry are not essential to the invention.

Figure 2:
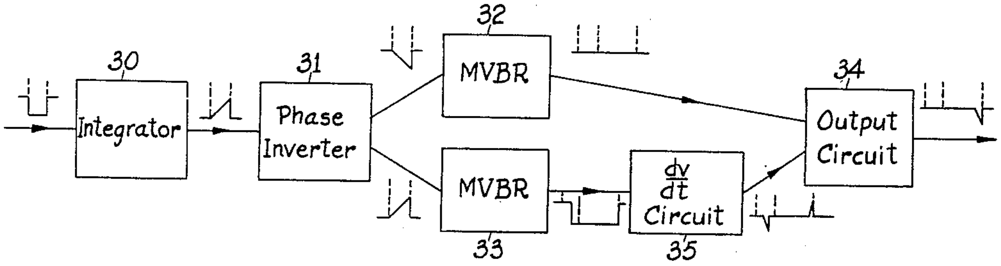
Fig. 2 shows in block diagram form an embodiment of this invention.

In Fig. 2 is shown an embodiment of this invention in block diagram form, this embodiment requiring that an input pulse be of less than one predetermined duration as well as greater than another predetermined lesser duration for its operation. The output of an integrator 30 is connected to the input of a phase inverter 31. The two outputs of phase inverter 31 are connected respectively to two multivibrators 32 and 33, the output of multivibrator 32 being connected to one input of output circuit 34 and the output of multivibrator 33 being connected through an associated differentiating circuit 35 before being connected to a second input of output circuit 34. As illustrated by the wave forms in Fig. 2, a negative input pulse of width indicated by the dotted lines is transformed by integrator 30 into a positive saw-eooth pulse or signal of constant slope and the same width as the input pulse. The resultant positive saw-tooth output of phase inverter 31 is utilized to trigger multivibrator 33 into operation, and the negative voltage gate obtained therefrom is differentiated by differentiating circuit 35, resulting in a negative spike coincident with the leading edge of the negative voltage gate and a positive spike coincident with its trailing edge. This positive spike will be utilized to trigger output circuit 34 into operation to produce a resultant negative output pulse providing output circuit 34 is not subjected to a blanking or disabling pulse or gate from multivibrator 32. Multivibrator 32 is triggered into operation by the corresponding negative saw-tooth from phase inverter 31 if this negative saw-tooth is of sufficient magnitude. If triggered into operation multivibrator 32 will provide a negative voltage gate output which when applied to output circuit 34 will prevent this output circuit from producing an output in spite of a positive spike received from differentiating circuit 35. In Fig. 2 no such voltage gate output is shown from multivibrator 32 since it is assumed that the input pulse to integrator 30 is not greater than the desired pulse width. Thus, by proper adjustment of multivibrator 33, an output will be produced from output circuit 34 only if the input pulse to the circuit is equal to or greater than (as shown) one desired pulse width, and by proper adjustment of multivibrator 32, output circuit 34 will be disabled from producing an output if the input pulse is of greater width than a second fixed pulse width limit greater than the first above-mentioned. As indicated by the wave forms, the negative output of multivibrator 33 must start at least a short time before the trailing edge of its input saw-tooth wave, and the trailing edge of the negative gate output may occur any fixed time desired thereafter, preferably being of the order of a few microseconds, however, in order not to cause too great a delay between the leading edges of the input pulse to integrator 30 and the output pulse from output circuit 34.

Figure 3:
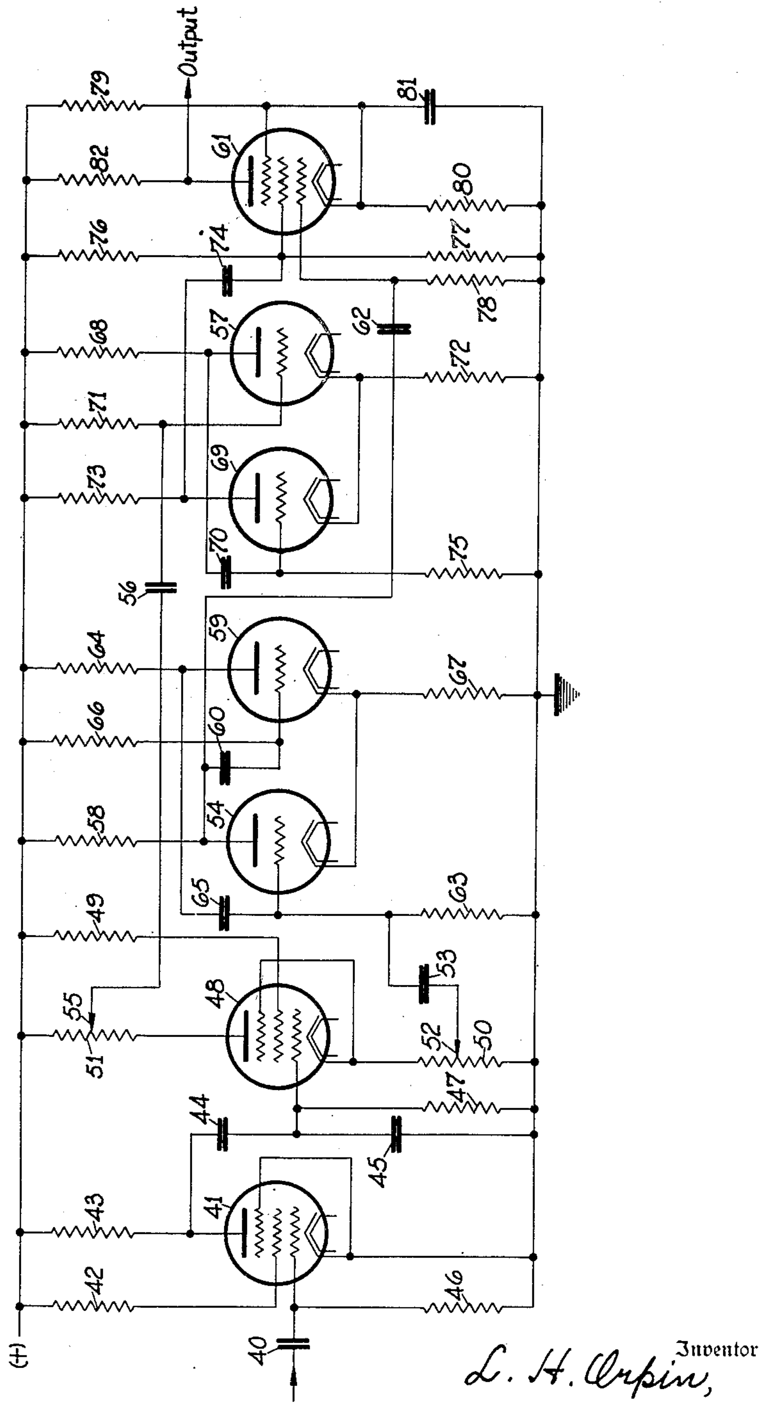
Fig. 3 is a circuit diagram of the embodiment shown in block diagram form in Fig. 2.

In Fig. 3 is shown a complete circuit diagram of the embodiment illustrated in block diagram form in Fig. 2. The negative input pulse is coupled by coupling condenser 40 to the control grid of integrator pentode 41, whose screen grid is returned to a positive source of potential through resistor 42 and whose suppressor grid and cathode are connected together and to ground. The plate of tube 41 is connected to the same source of positive potential through resistor 43 and to ground through condensers 44 and 45 in series, and its control grid is returned to ground through resistor 46. The junction point of condensers 44 and 45 is connected to ground through resistor 47 and to the control grid of phase inverter pentode 48, whose screen grid is connected to the above-mentioned source of positive potential through resistor 49 and whose suppressor grid and cathode are connected together and to ground through the resistance strip of potentiometer 50. The plate of pentode 48 is connected to the above-mentioned source of positive potential through the resistance strip of potentiometer 51. The slider arm 52 of potentiometer 50 is connected through coupling condenser 53 to the grid of tube 54, and slider arm 55 of potentiometer 51 is connected through coupling condenser 56 to the grid of tube 57. The plate of tube 54 is connected to the same source of positive potential through resistor 58, to the grid of tube 59 through condenser 60, and to the control grid of pentode 61 through differentiating condenser 62, and its control grid is returned to ground through resistor 63. The plate of tube 59 is connected to the above-mentioned source of positive potential through resistor 64 and to the grid of tube 54 through coupling condenser 65, its grid is returned to the same source of positive potential through resistor 66, and its cathode and that of tube 54 are connected together and to ground through resistor 67. Thus, tubes 54 and 59 constitute a delay multivibrator 33. The plate of tube 57 is connected to the above-mentioned source of positive potential through resistor 68 and to the grid of tube 69 through condenser 70, its grid is returned to the same source of positive potential through resistor 71, and its cathode and that of tube 69 are connected together and to ground through cathode resistor 72. The plate of tube 69 is connected to the same source of positive potential through resistor 73 and to the screen grid of pentode 61 through condenser 74, and its grid is connected to ground through resistor 75. Thus, tubes 57 and 69 constitute the second multivibrator 32. The screen grid of pentode 61 is also tied to the junction point of resistors 76 and 77, which are connected in series between the above-mentioned source of positive potential and ground, thus positively biasing this screen grid. The control grid of pentode 61 is returned to ground through differentiating resistor 78, its suppressor grid and cathode are connected together and to the same source of positive potential through resistor 69 and to ground through resistor 80 and condenser 81 connected in parallel, and its plate is connected to the same source of positive potential through resistor 82. The output of pentode 61 is conventionally taken from its plate and this pentode is normally "off" or non-conducting due to its cathode biasing.

*Operation.*—Each negative pulse coupled through condenser 40 to the grid of pentode tube 41 will turn this tube "off" for a time dependent upon its duration or pulse width. Whenever pentode 41 is turned "off," condenser 45 starts charging toward the potential of the positive potential source and thus a positive saw-tooth wave or pulse is produced at the control grid of phase inverter tube 48, the peak amplitude this saw-tooth attains being a direct measure of the duration of the input pulse to tube 41. A portion of the positive saw-tooth at the cathode of tube 48 is picked off by arm 52 of potentiometer 50 and connected to the delay multivibrator 33 comprising tubes 54 and 59, and a portion of the corresponding negative saw-tooth appearing at the plate of tube 48 is picked off by arm 55 of potentiometer 51 and connected to the multivibrator 32 comprising tubes 57 and 69. If the input pulse applied to tube 41 is of sufficient duration, the portion of the positive saw-tooth thus applied to the grid of tube 54 will turn this tube "on" and tube 59 abruptly "off," and this condition will obtain for a time fixed by the circuit constants of multivibrator 33, preferably assumed to be on the order of a few microseconds as above-explained. The resulting negative pulse or voltage gate at the plate of tube 54 is differentiated by differentiating circuit 35, comprising condenser 62 and resistor 78, and the positive differentiated pulse produced coincident with the trailing edge of this negative voltage gate is applied to the control grid of output pentode 61 to produce an output at the plate of this tube if a negative voltage gate is not simultaneously applied to its screen grid. The portion of the negative saw-tooth applied to the grid of tube 57, if of sufficient magnitude, will turn this tube "off" and tube 69 "on" abruptly, producing a negative voltage gate at the plate of tube 69, and this condition will continue for a time fixed by the circuit constants of this multivibrator 32. Adjustment of arm 52 of potentiometer 50 controls the minimum input pulse duration which will trigger the multivibrator 33, comprising tubes 54 and 59, into operation to produce an output from pentode 61, and adjustment of arm 55 of potentiometer 51 controls the maximum duration pulse passed by the pentode 61, since if a pulse greater than this maximum setting is received, it will trigger multivibrator 32, comprising tubes 57 and 69, into operation, thus producing a disabling negative voltage gate at the plate of multivibrator tube 69 which will then be coupled to the screen grid of pentode 61 to prevent its operation even though a differentiated positive pulse from condenser 62 is simultaneously received at its control grid.

In Fig. 4 are shown typical circuits of another embodiment which is adapted to identify and separate pulses of various durations, pulses of each distinctive duration being utilized to operate a typical control circuit such as that shown. By referring to Fig. 4 it is readily observed that the first two tubes 91 and 92 are common to a plurality of chains or series of tubes each terminating in a relay, of which the first chain has been shown completely and the second chain fragmentarily. The first tube 91 is an integrating tube which has the values of its plate condenser 93 and plate resistor 94 so chosen that the output of the plate circuit will gradually increase in amplitude during the time an input pulse of sufficient magnitude to drive tube 91 below cut-off is applied to its control grid, so that the amplitude of the ultimate plate output potential depends upon the duration of the pulse. That is, tube 91 converts a pulse of any particular duration into a saw-tooth pulse of commensurate amplitude. As is readily seen, the output from tube 92 is taken from its cathode circuit and constitutes the voltage drop across resistor 95. Tube 92 is thus a cathode follower which does not materially change the shape of the saw-tooth pulse nor its amplitude, but does enable appreciable current to be drawn from its cathode circuit without appreciable attenuation by reason of the low impedance of this output cathode circuit. The output from tube 92 is applied to the control grids of a plurality of critically adjusted amplifiers 96, 97, etc., via coupling condensers 98, 99, etc.

Tube 96 has its control grid biased below cut-off, the amount of this bias being controlled by the setting of potentiometer 100 since this grid bias is obtained to a large extent through the medium of the screen current flowing through screen resistor 101, cathode resistor 102, and the effective portion of potentiometer 100 in series. By referring to Fig. 5 it will be seen it has been assumed that potentiometer 100 has been adjusted such that the critically adjusted amplifier 96 connected to multivibrator 103 will not respond to a pulse corresponding to an input pulse of 0.6 μs. (microseconds) duration, but will respond to a pulse corresponding to an input pulse of 0.7 μs. duration or any pulse in excess thereof. It will also be seen that the next amplifier tube 97, which precedes the multivibrator 104, will respond to pulses of 1.5 μs. for longer duration. Similarly, the next two chain critically adjusted amplifier tubes (not shown) will respond to pulses corresponding to 2.5 to 3.5 microsecond input pulses respectively.

The ohmic value of resistor 102 in the cathode circuit of tube 96 is so chosen with respect to the other circuit parameters that this tube has a degenerative feed-back effect. Thus if pulses of substantially greater amplitude than that necessary to cause the tube to conduct are applied to its control grid, the amplification of this tube will be reduced and the amplitude of the pulse from its plate circuit will hence be reduced from what would otherwise be expected. Furthermore, this degenerative feed-back effect will produce a pulse in the plate circuit of comparatively short duration. The reason for this designed functional characteristic of amplifier tubes 96, 97, etc., is that it is desired to have these tubes initiate their respective associated multivibrators 103, 104, etc., only once for each pulse produced in their respective plate circuits.

As shown, the plate output from tube 96 is coupled via condenser 105 to the control grid of the right-hand or "on" tube of the multivibrator 103, which is a so-called "one-shot" multivibrator with positive grid return. This output pulse from tube 96 is negative, and its application to the grid of the right-hand or "on" tube will cause a reduction in the current flowing through this tube. This reduction in current flow in the right-hand tube plate circuit will cause its plate potential to rise abruptly and thereby transmit a pulse of positive polarity through condenser 106 to the control grid of the left-hand tube of multivibrator 103. In other words, the conduction of the right-hand tube decreases and the flow of current through the left-hand tube increases, and this continues until temporary stability is reached with conduction of the left-hand tube at a maximum and that of the right-hand tube reduced to zero. During this temporary stable condition, current flow through resistor 107 charges up condenser 105 and raises the potential of the grid of the right-hand tube gradually until it reaches cut-off. At the same time condenser 106 is being gradually discharged due to current flow through resistor 108. When the potential of the grid of the right-hand tube reaches cut-off, this tube again conducts, its plate potential is thus reduced suddenly, and this reduction in potential is coupled back via condenser 106 to the grid of the left-hand tube, turning this tube "off." This is the normal stable condition of multivibrator 103, with its right-hand tube conducting and its left-hand tube substantially non-conducting.

This cyclic action of multivibrator 103 thus produces a momentary negative voltage gate in the plate circuit of the left-hand tube as is shown in the wave forms for multivibrator 103 (Fig. 5, line C). This negative gate is next coupled to the control grid of amplifier tube 111 through a differentiating network including condenser 109 of extremely low capacity, for instance, 40 micro-microfarads, and resistor 110, having an ohmic value of say 12,000 ohms. This differentiating network causes the beginning of the gate applied thereto to produce a sharp negative potential drop or spike across resistor 110 and the end of this gate to produce a positive spike of lesser amplitude and duration but still of sufficient amplitude to bring the grid voltage of tube 111 above cut-off to render this tube conducting unless its control grid is simultaneously made negative by a gate delivered from the multivibrator 104 of the next series or chain through resistor 112 and its associated condenser 113 in series. The negative and positive spikes have been shown in the graph representing the waveform at the grid of tube 111, line D of Fig. 5 of the drawings. The negative spike delivered from the plate of the left-hand tube of multivibrator 103 to the grid of tube 111 will, of course, have no effect because this tube is biased to cut-off, this negative pulse thus merely increasing the negative bias on the tube. The positive spike, however, which is also created by the differentiating network, is of sufficient magnitude and of the proper polarity to overcome this negative grid bias on tube 111 as shown and thereby causes tube 111 to be turned "on" or conduct.

This conduction of tube 111 produces a negative pulse of short duration on its plate circuit (line E, Fig. 5) which is coupled through the diode 114 (Fig. 4) to the control grid of a normally conducting D. C. amplifier 115. The plate circuit of amplifier 115 is coupled to the control grid of a gas-type tube 116 through resistor 117. In practice it is assumed that the pulses to be discriminated by the apparatus of the present invention are repeated periodically at any desired rate, such as 15 times per second, and these repeated negative pulses flowing through diode 114 will produce an accumulation of negative charge on the grid of D. C. amplifier 115 sufficient to reduce the conduction of this tube and thereby bring its plate potential up to a value where the ensuing tube 116 will fire or conduct. Tube 116 has its cathode normally biased positively to such an extent that the tube will not fire in response to the A. C. voltage applied to its plate circuit. This cathode bias of tube 116 is produced due to its cathode being directly connected to the cathode of amplifier 115, there being a normal flow of cathode current through this amplifier 115 and also through resistor 118 to ground due to amplifier 115 being "on" or conducting. In other words, the cathode current of tube 115 flowing through resistor 118 maintains the potential of the cathode of gas-type tube 116 above its grid potential so that its grid is therefore negative with respect to its cathode. It will be seen that this potential at the grid of tube 116 is produced by a network including resistors 118 and 119 in series with two multiple branches, one of which includes resistors 117 and 120 and the other the internal resistance of tube 115. It is thus seen that when the conduction through tube 115 decreases, as it will in response to the application of a negative potential to its control grid, not only is the potential at the plate of tube 115 increased to thereby increase the grid potential on tube 116, but also the resistance drop through resistor 118 is decreased to thereby reduce the potential at the cathode of tube 116, and this double or accumulative effect upon the potential difference between the grid and cathode of tube 116 will cause this tube to fire during every positive cycle of A. C. current flowing from the secondary coil of transformer 121 through the relay 122, both of which are in the plate circuit of tube 116 as shown. Obviously, if negative pulses flowing through diode 114 cease, the negative pulses applied to the grid of tube 115 will disappear and this tube will again conduct. When it conducts, its plate potential decreases, and this reduced potential is coupled to the grid of tube 116 via resistor 117 so that this tube will no longer fire during the positive cycles of the alternating current potential applied to its plate circuit. That is, the relay 122 will be deprived of energy at the end of the first positive wave of alternating current applied to the plate circuit of tube 116 following the fall in potential of its grid below that value at which the tube will fire. The contacts of relay 122 will of course thus open when pulses are no longer delivered from the plate circuit of the double input control amplifier 111.

It should now particularly be noted that if the pulse under consideration should be of such duration that both of the amplifiers 96 and 97 are caused to conduct and both of the associated multivibrators 103 and 104 are caused to operate through one cycle of operation simultaneously, the gate produced by the multivibrator 104 will completely neutralize or overcome the positive spike created by the differentiating network preceding tube 111. As a result, the double input controlled amplifier 111 will not be caused to conduct and hence the relay 122 will not operate. In other words, in order to pick up relay 122, the pulse must be of sufficient duration to actuate amplifier 96 but must not be of sufficient duration to actuate amplifier 97.

In this connection it should be observed that the negative voltage gate or pulse that is produced at the plate of the left-hand tube of multivibrator 103 and applied to the grid of tube 111 may also after several differentiations reach the grid of tube 123. Before this pulse, however, reaches the grid of tube 123 it must pass through resistor 112 and three differentiating networks 109—110, 113—124, and 125—126. Because of these three networks, the resultant input at the grid of tube 123 due to this negative pulse is appreciably reduced in magnitude, and it is also attenuated by its passage through resistor 112. In other words, by the time the resultant signal reaches the grid of tube 123, it is no longer of sufficient amplitude to cause this tube to conduct. Therefore, even though this structure constitutes a maginal arrangement, it is in fact reliable because the margins of operation are sufficiently great. Furthermore, the amplitude of the voltage gates delivered by the multivibrators 103, 104, etc., are fixed by design and are independent of the amplitude of the original pulse received at the grid of tube 91.

As above-explained, the second chain has been shown only fragmentarily, including amplifiers 97 and 123 and multivibrator 104. The circuit components, connections, and operation of these are similar to those of amplifiers 96 and 111 and multivibrator 103, respectively, and hence will not be discussed here in detail. The output of amplifier 123, taken from its plate, is fed to an output circuit not shown but similar to that illustrated for the first chain, including diode 114, D. C. amplifier 115, and gas-type tube 116, and controlling a relay 122. The output from a third chain multivibrator (not shown) is also coupled through a condenser 127 and resistor 128 in series to the control grid of double-input controlled amplifier 123 for disabling purposes as will be pointed out more specifically hereinafter in connetcion with Fig. 5.

As previously indicated, double-input controlled amplifiers 111, 123, etc., may be replaced by gated amplifiers, which perform the same function, and in Fig. 4*a* has been illustrated such a gated amplifier 123*a* and its associated circuit, which may be substituted for the double input controlled amplifier 123 of Fig. 4 and its associated circuit. Although the margins of operation of double-input amplifier 123 are more than adequate and therefore safe, as above-discussed, if it is replaced by the gated amplifier 123*a* of Fig. 4*a*, all questions of margins will be removed in that two independent grids on the same tube are controlled and no circuit connections of any kind exist between the control grids of the various gated amplifiers.

The operation of the system is substantially the same irrespective of whether the double input controlled amplifier 123 or the gated amplifier 123*a* of Fig. 4*a* is employed. If amplifier 123 is used, the suppression or disabling function is accomplished by the transmission of a negative gate to its control grid, whereas if the gated amplifier 123*a* is used, such a negative gate is transmitted to its screen grid to suppress or disable the tube action in spite of the simultaneous transmission of a positive pulse to its control grid.

Referring to Fig. 4*a* it will be observed that all of the resistors associated with tube 123*a* are the same as those associated with tube 123 except that resistor 129 and condenser 130 have been omitted and that resistor 131 has been added. Resistor 131 has been added to provide a definite and fixed positive bias on the screen grid so that this tube will conduct if a positive pulse of adequate amplitude is applied to its control grid but will not conduct if simultaneously therewith a negative pulse is applied to the screen grid via a diode or rectifier 132. The conventional showing of rectifier 132 includes a downwardly pointing arrow, signifying that positive pulses will be conducted in a downward direction and negative pulses will be conducted in an upward direction. The operation of the system is substantially the same when the gated amplifier 123*a* is used as when the double input controlled amplifier 123 is used, for which reason the operation of the system when modified as illustrated in Fig. 4*a* will not be further discussed in detail.

In Fig. 4*b* is shown a modified circuit which may be substituted for the relay control circuit comprising tubes 114, 115 and 116 and transformer 121 of Fig. 4. Briefly, it includes a multivibrator 135, power amplifier 136, and rectifier 137. This modified circuit provides a constant power to relay 122 from the source of regularly repeated pulses available at the plate of tube 111 (Fig. 4) and provides foolproof and dependable operation of relay 122 in that the relay will not be operated by ordinary failure or disarrangement of the circuit components, thus insuring that when relay 122 operates it is because a pulse input has been applied to multivibrator 135. As indicated, the output from the plate of tube 111 (Fig. 4) is applied through coupling condenser 138 to the grid of the first tube of "one-shot" multivibrator 135, and the output from the plate of that same tube is coupled through condenser 139 to the grid of biased inverter-amplifier 136 which is designed to be of the power amplifier type. The output from the plate of tube 136 is coupled through condenser 140 and rectifier 137, which preferably is of the bridge rectifier type in order to obtain the largest possible power output, to the coil of relay 122. This circuit of Fig. 4*b*, as above-mentioned, will deliver a constant power output in response to an input of regularly spaced pulses whose repetition frequency may vary within wide limits, these limits of the circuit shown being 7 to approximately 10,000 C. P. S. Multivibrator 135 produces a variable frequency output of approximately equal positive and negative halves, this variable frequency being dependent, of course, upon the repetition frequency of the input pulses, and this multivibrator will frequency divide up to the limit of its given circuit parameters if its free-running designed frequency is greater than fifty per cent of the input pulse frequency. Initially the multivibrator constants are chosen to obtain a square wave output for the lowest input pulse frequency desired (in this case, 7 C. P. S.) and therefore a square wave output will be obtained for any greater frequency up to the limit fixed by the circuit parameters chosen (approximately 10,000 cycles here). Inverter-amplifier 136 is normally off due to the negative bias provided as shown, and the output of multivibrator 135 being applied to its grid results in a greater amplified square wave being produced at its plate, this amplified square wave thereafter being full-wave rectified by rectifier 137 in order to supply rectified D. C. to operate relay 122. Providing condenser 140 is large enough (approximately 2 microfarads in the embodiment shown), except for multivibrator 135 the circuit illustrated is frequency insensitive above the lowest frequency for that which it is designed, e. g., 7 cycles, or in other words, the power output to the relay is constant above that frequency. It is, of course, obvious that bridge rectifier 137 shown could be replaced by any other rectifier circuit, one-half wave or full-wave according to the particular power output requirements, and that the output of the circuit of Fig. 4*b* instead of being applied to the coil of relay 122 could be used for many other purposes. For instance, by applying the output through a condenser for smoothing purposes, a D. C. bias voltage would be produced which could be used for a multiplicity of biasing applications.

*Operation.*—Let us now assume that the apparatus illustrated in Fig. 4 has been expanded to include five previously adjusted amplifiers, five cooperating multivibrators, four double input control amplifiers (Fig. 4) or gated amplifiers (Fig. 4*a*), four relays, and four associated cooperating relay control circuits according to Figs. 4 or 4*b*. As is readily understood from Fig. 5 and as will be more fully pointed out hereinafter, the four successive amplifiers (the first two of which comprising tubes 96 and 97 respectively, are shown in Fig. 4) will respond to pulses whose durations lie within the limits 0.7 and 1.5, 1.5 and 2.5, 2.5 and 3.5, and 3.5 and 4.5 microseconds respectively. Thus it is seen that there are five series or chains of tubes such as 96 and 103 and that there are only four series of tubes such as 111, 114, 115, and 116; 111*a*, 114, 115, and 116; 111, 135, 136, and 137; or 111*a*, 135, 136, and 137. It should thus be apparent that each double input controlled or gated amplifier is controlled by two multivibrators if it is desired to fix both an upper and lower limit to the duration of the input pulse to which each responds, and this is the reason for requiring, by one, more multivibrators than double input controlled or gated amplifiers. Of course, the additional multivibrator might be dispensed with if it was desirable that, or immaterial whether, the last successive relay operated in response to an input pulse of greater than the predetermined magnitude. Thus in the present embodiment, the elimination of the fifth multivibrator would cause the fourth or last amplifier and relay to operate in response to any input pulse whose duration exceeded 3.5 microseconds. Also, while in the present embodiment each double input controlled or gated amplifier has been described and shown as being controlled by two adjacent multivibrators, it is of course obvious that this is not necessary. As an example, the circuits shown could be modified to have the operation of the first amplifier, for instance, disabled by the fourth, or third and fourth, or second and third multivibrators if such was desirable in a particular application.

In Fig. 5 the functions performed by the group of devices assumed for the present embodiment has been graphically illustrated. The first line, line A illustrates pulses of the various widths or lengths. Line B shows the resultant saw-tooth outputs produced at the output of the integrating tube 91 when the five different pulse lengths illustrated in line A are applied to its control grid in succession. It will be seen that the first pulse, which is assumed to be of 0.6 μs. (microsecond) duration, will produce a saw-tooth pulse of insufficient amplitude to cause any one of the tubes 96, 97, etc., to conduct. The second pulse, assumed to be of 1 μs. duration, creates a saw-tooth pulse of amplitude sufficient to cause amplifier 96 to conduct and the multivibrator 103 to perform a single cycle of operation, but not sufficient to cause tube 97 to conduct. This will cause amplifier 111 to conduct because no blocking or disabling pulse has been received via resistor 112. Fig. 5 does not show performance beyond the amplifiers 111, 112, etc., but the functioning of their respective relays 122, etc., is, of course, controlled by these amplifiers as above-described. It will be recalled that none of the relays 122, etc., are energized in response to pulses of 0.6 μs. duration, that relay 122 only is energized if the pulse is of 1 μs. duration, that the next relay only is energized when the pulse is of 2 μs. duration, that the next successive relay only is energized when the pulse is of 3 μs. duration, and that the last relay only is energized when the pulse is of 4 μs. duration. As shown by the dotted saw-teeth (line B, Fig. 5) and the dotted pulses (line A, Fig. 5) about one-half microsecond variation in pulse length both above and below these values may be tolerated without a change in results.

Referring again to the portion of Fig. 5 directly below the 1 microsecond pulse illustrated, it will be seen that the multivibrator 103 creates a voltage gate output (line C), and that the amplifier 111 has applied to its control grid circuit the double spike created by the differentiating network 109—110 (line D). Also the output at the plate of tube 111 is then a negative pulse because the effect of the pulse on the grid of this tube was not neutralized by a gate delivered from the multivibrator 104 through the circuit including condenser 113 and resistor 112 (line E).

Referring now to that portion of Fig. 5 applying to a 2 μs. pulse, it will be seen that negative gates are produced by both multivibrators 103 and 104 (lines C and F, respectively) and that the later gate (line F), produced by multivibrator 104, has been impressed upon the grid of tube 111 via resistor 112 and condenser 113 so that this grid is not brought above cut-off by the pulse from its own multivibrator 103 (line D), and thus tube 111 will not conduct (line E). As can been seen in line D, this is because the voltage gate produced by multivibrator 104 pulls the grid voltage of tube 111 down below cut-off at that point where the second and positive spike exists so that this spike can no longer cause tube 111 to conduct. Because tube 111 does not conduct, the pulse which would otherwise have been produced at its plate circuit has been indicated by dotted lines in line E, meaning that such pulse does not now exist. In other words, even though the 2 microsecond pulse will cause operation of both tube 96 and multivibrator 103, tube 111 will not conduct current and the relay 122 controlled thereby will not operate. The next chain relay will, however, operate due to amplifier 123 conducting (line H). Similarly, for a 3 μs. pulse the next multivibrator will render ineffective the pulse applied via tube 97 and multivibrator 104 to the control grid of tube 123 (line G) because this control grid is brought negative by a gate produced by this next multivibrator (not shown in Fig. 4), this gate being conventionally illustrated for the 3 μs. pulse in line I. The operation of the circuits for a 3 μs. pulse is illustrated in lines I, J, and K and for a 4 μs. pulse in lines L, M, and N in a similar fashion and will not be discussed in detail. It should be noted, however, that line O represents the output of the fifth multivibrator, which as above-mentioned has no associated cooperating fifth amplifier similar to amplifier 123 or 123*a* and whose only function is to disable the fourth amplifier if the duration of the input pulse exceeds 4.5 microseconds. The operation of the fifth multivibrator in that event has been indicated by dotted lines in line O, and its consequent effect upon the fourth amplifier by dotted lines in lines M and N, this effect being similar to that above-discussed in connection with the other amplifiers 111, 123, etc.

Attention is again particularly directed to the fact brought out by the operational time chart of Fig. 5 that for a 0.6 microsecond pulse none of the relays are energized, for a 1 microsecond pulse only the relay 122 is energized, for a 2 microsecond pulse only the next relay is energized, for a 3 microsecond pulse only the next successive relay is energized, and for a 4 microsecond pulse only the last relay is energized. Attention is also directed to the fact that the gate generated by multivibrator 104, for instance, which results in the operation of the second relay is the very same gate which prevents the first relay 122 from operating. This is a very desirable interlocking feature in that any pulse which is long enough to cause the amplifier 97, for instance, to conduct will not only cause the second relay to operate but will also in fact prevent the first relay 122 from operating. Whether or not the second relay will operate will, of course, also depend upon whether the pulse is long enough to cause operation of the third successive multivibrator (not shown in Fig. 4).

As pointed out above, some of the duplicated tubes and their associated circuits and devices have not been specifically illustrated, and it should be understood that they are the same as those shown except for certain adjustments necessary to make them function properly in response to pulses of specific durations. For instance, as illustrated in Fig. 5, successive multivibrators deliver pulses or gates which are successively longer, and successive critically adjusted amplifiers respond only to successively higher grid voltages. Also, while the term "saw-tooth wave" has been used in this specification as referring to the initial substantially linear portion of an exponential wave, it is to be understood that the disclosed circuits will operate equally well with true saw-tooth wave inputs, and the circuits shown for producing exponential outputs may be replaced by circuits for producing true linear saw-tooth outputs.

Having thus shown and described several specific arrangements of circuits and devices embodying the present invention, and having illustrated graphically how the system of Fig. 4 functions when it is extended to four relays, it should of course be understood that the particular systems illustrated and operationally diagrammed do not exhaust all the possible forms the invention may take, and that various changes, modifications and additions may be made to adapt the invention to the particular problems encountered in practicing the same without departing from the spirit or scope of the invention, which is defined in the following claims.

What is claimed is:

1. In apparatus of the class described the combination of a linear pulse integrator for converting pulses of different durations into corresponding pulses whose amplitudes are a measure of said durations, a cooperating amplitude discriminator connected to said integrator and responsive to said corresponding pulses whose amplitudes are greater than a first predetermined value, and an output control connected to said integrator and to the input of said discriminator to render said discriminator nonresponsive to pulses whose amplitudes exceed a predetermined value greater than said first predetermined value.

2. In apparatus of the class described the combination of a linear pulse integrator for converting pulses of different durations into corresponding pulses whose amplitudes are a measure of said durations and a plurality of cooperating amplitude discriminators connected in parallel to the output of said integrator and responsive to said corresponding pulses, each successive amplitude discriminator being responsive only to pulses of greater amplitude than that to which the next preceding amplitude discriminator is responsive and each successive amplitude discriminator including a control for disabling each preceding amplitude discriminator from producing an output corresponding to its input pulse on receipt of a pulse to which the respective successive amplitude discriminator is responsive, whereby only one amplitude discriminator will produce an output for a single pulse applied simultaneously to said plurality of amplitude discriminators in parallel.

3. In apparatus of the class described the combination of a linear pulse integrator for converting pulses of different durations into corresponding saw-tooth pulses whose amplitudes are a measure of said durations and a plurality of cooperating amplitude discriminators connected in parallel to the output of said integrator and responsive to said corresponding pulses, each successive amplitude discriminator being responsive only to a pulse of greater amplitude than that to which the next preceding amplitude discriminator is responsive and each successive amplitude discriminator including an output control for disabling the preceding amplitude discriminator from producing an output corresponding to its input pulse on receipt of a pulse to which the respective successive amplitude discriminator is responsive, whereby only one amplitude discriminator will become effective when a single pulse is simultaneously applied to said plurality of amplitude discriminators in parallel.

4. In apparatus of the class described the combination of a linear pulse integrator for converting input pulses of different durations into saw-tooth pulses of peak amplitudes commensurate with said durations, a plurality of cooperating electron tubes having their inputs connected in parallel to the output of said integrator, each of said plurality of electron tubes being so biased that it will conduct only for that portion of a saw-tooth pulse applied to its input which exceeds a predetermined amplitude, and an output control for and connected to each electron tube and responsive to the next successive output control to render the output control of said tube non-responsive to inputs caused by saw-tooth pulses whose amplitudes exceed a predetermined value greater than the predetermined value for which said tube is biased to conduct.

5. In apparatus of the class described the combination of a linear pulse integrator for converting pulses of different durations into corresponding pulses whose amplitudes are a measure of said durations, a plurality of cooperating amplitude discriminators, each connected in parallel to the output of said integrator and responsive to said corresponding pulses, each successive amplitude discriminator being responsive only to a pulse of greater amplitude than that to which the next preceding amplitude discriminator is responsive, and an output control for and connected to each discriminator and responsive to the next successive output control to render the output control of said discriminator non-responsive to inputs caused by pulses whose amplitudes exceed a predetermined value greater than that to which said discriminator is responsive.

6. In apparatus of the class described the combination of a linear pulse integrator for converting pulses of different durations into corresponding pulses whose amplitudes are a measure of said durations, a series of amplitude discriminators, each connected in parallel to the output of said integrator and responsive to said corresponding pulses, each successive amplitude discriminator being responsive only to a pulse of greater amplitude than that to which the next preceding amplitude discriminator is responsive, and an output control for and connected to each discriminator, each output control in part including the next succeeding output control of the series, to render the output control of said discriminator non-responsive to inputs caused by pulses whose amplitudes exceed a predetermined value greater than that to which said discriminator is responsive.

7. In apparatus of the class described the combination of a linear pulse integrator for converting input pulses of different durations into saw-tooth pulses having peak amplitudes of commensurate magnitude, a series of electron tubes having their inputs connected in parallel to the output of said integrator, each successive one of said series of electron tubes being biased to a greater extent than the next preceding tube so that when suitable supply potentials are applied thereto each succeeding tube will start conducting at a predetermined amplitude of a saw-tooth pulse applied to its input, which amplitude for each succeeding tube is greater than for any preceding tube, a plurality of multivibrators, one for and connected to each electron tube and each successive multivibrator producing a successively longer negative output with each negative output having at least a portion occurring simultaneously with the trailing edge of the negative output of the next preceding multivibrator, and a corresponding plurality of amplifiers and differentiating circuits, the input of each amplifier being connected through the corresponding differentiating circuit to its corresponding multivibrator and each multivibrator after the first of said series being electrically connected to the amplifier of the next preceding multivibrator, each amplifier being responsive to the differentiated pulse produced simultaneously with the trailing edge of the negative output of its corresponding multivibrator, and wherein the negative output if any of each of said multivibrators after the first is of sufficient magnitude to render ineffective the differentiated pulse of the preceding multivibrator, whereby only one of said amplifiers provides an output for an input pulse of specific duration.

8. In apparatus of the class described the combination of a linear pulse integrator for converting input pulses of different durations into saw-tooth pulses having peak amplitudes of commensurate magnitude, a series of electron tubes having their inputs connected in parallel to the output of said integrator, each successive one of said series of electron tubes being biased to a greater extent than the next preceding tube so that when suitable supply potentials are applied thereto each succeeding tube will start conducting at a predetermined amplitude of a saw-tooth pulse applied to its input, which amplitude for each succeeding tube is greater than for any preceding tube, a plurality of multivibrators, one for and connected to each electron tube and each successive multivibrator producing a successively longer negative output with each negative output having at least a portion occurring simultaneously with the trailing edge of the negative output of the next preceding multivibrator, and a plurality of amplifiers and differentiating circuits, one of each for each successive pair of said multivibrators, each amplifier being connected through the corresponding differentiating circuit to the first of its associated multivibrators and directly to the second of its associated multivibrators and responsive to the differentiated pulse produced simultaneously with the trailing edge of the negative output of the first of its associated multivibrators, and wherein the negative output if any of each of said multivibrators after the first is of sufficient magnitude to render ineffective the differentiated pulse of the preceding multivibrator, whereby only one of said plurality of amplifiers provides an output for an input pulse of specific duration.

9. In apparatus of the class described the combination of a series of generators for electrically creating pulses of energy, a corresponding plurality of amplifiers each for and electrically connected to its respective generator, and an output control for each generator but the first and each connected between its respective generator and the amplifier of the next preceding generator for disabling that amplifier from producing an output corresponding to its input pulse when the successive generator creates a pulse of energy, whereby only one of said amplifiers can produce an output at any given time.

10. In apparatus of the class described the combination of a series of multivibrators and a plurality of controlled input amplifiers and differentiating circuits for and electrically connected to said multivibrators, each controlled input amplifier having its input connected through a differentiating circuit to the output of one multivibrator and directly to the similar output of the next successive multivibrator and responsive to the differentiated pulse produced simultaneously with the trailing edge of the output of said one multivibrator, and wherein at least a portion of said similar output if any of said next successive multivibrator occurs simultaneously with the trailing edge of the output of said one multivibrator and is of sufficient magnitude to render ineffective the otherwise effective differentiated output of said one multivibrator, whereby only one of said amplifiers can produce an output at any given time.

11. In apparatus of the class described the combination of an integrator for converting input pulses of different durations into saw-tooth pulses whose peak amplitudes are of commensurate magnitude, a phase inverter to whose input is connected the output of said integrator, a first and second multivibrator connected to the first and second outputs respectively of said phase inverter, said first multivibrator being adjusted to produce an output therefrom only in response to an output from said phase inverter produced by an input to the apparatus whose duration exceeds a first given magnitude and said second multivibrator being adjusted to produce an output therefrom only in response to an output from said phase inverter produced by an input pulse to the apparatus whose duration exceeds a second given magnitude greater than said first magnitude, a differentiating circuit, and an output circuit, the output of said first multivibrator being connected to the input of said output circuit through said differentiating circuit to provide an output therefrom in response to an input pulse to said apparatus whose duration exceeds said first given magnitude, and the output of said second multivibrator being connected directly to the input of said output circuit and being of sufficient magnitude to render ineffective the differentiated output of said first multivibrator if the duration of the input pulse to said apparatus exceeds said second magnitude.

12. In apparatus of the class described the combination of an integrating electron tube for converting input pulses of different durations into saw-tooth pulses whose peak amplitudes are of commensurate magnitude, a cathode follower whose input is connected to the output of said input tube, a plurality of critically adjusted amplifiers connected in parallel to said cathode follower, each of said critically adjusted amplifiers being so biased that it will conduct only for that portion of a saw-tooth pulse applied to it which exceeds a predetermined amplitude and each of said amplifiers being differently biased, a corresponding plurality of multivibrators, each connected to its corresponding critically adjusted amplifier, a plurality of controlled input amplifiers and differentiating circuits, one of each for each successive pair of said multivibrators, each controlled input amplifier being connected through its differentiating circuit to the output of the first of its associated multivibrators and directly to the output of the next successive multivibrator, and a plurality of isolating diodes, D. C. amplifiers, gas-type tubes, and relays, one of each for each controlled input amplifier, the output of each controlled input amplifier being applied to a separate isolating diode, the output of each diode being connected to a D. C. amplifier, the output of each D. C. amplifier being connected to a gas-type tube, and each gas-type tube including in its output circuit a relay, whereby only one of said plurality of relays is actuated in response to an input pulse of specific duration.

13. In apparatus of the class described the combination of an integrating electron tube for converting input pulses of different durations into saw-tooth pulses whose peak amplitudes are of commensurate magnitude, a cathode follower whose input is connected to the output of said input tube, a plurality of critically adjusted amplifiers connected in parallel to said cathode follower, each of said critically adjusted amplifiers being so biased that it will conduct only for that portion of a saw-tooth pulse applied to it which exceeds a predetermined amplitude and each of said amplifiers being differently biased, a plurality of multivibrators, each connected to its corresponding critically adjusted amplifier, a plurality of gated amplifiers and differentiating circuits, one of each for each successive pair of said multivibrators, each gated amplifier including a screen grid and a control grid, the control grid of each gated amplifier being connected through its differentiating circuit to the output of the first of its associated multivibrators and the screen grid of each gated amplifier being directly connected to the output of its second associated multivibrator, and a plurality of additional multivibrators, power amplifiers, rectifiers, and relays, one of each for each gated amplifier, the output of each gated amplifier being applied to a separate one of said additional multivibrators, the output of each additional multivibrator being connected to the corresponding power amplifier, the output of each power amplifier being connected to its corresponding rectifier, and each of said rectifiers being connected to its corresponding relay, whereby only one of said plurality of relays is actuated by an input pulse of specific duration.

14. In apparatus of the class described the combination of an integrator for converting input pulses of different durations into saw-tooth pulses having peak amplitudes of commensurate magnitude, a series of electron tubes having their inputs connected in parallel to said integrator, each of said electron tubes being so biased that it will conduct only for that portion of a saw-tooth pulse applied to its input which exceeds a predetermined value and each of said electron tubes being differently biased, a corresponding plurality of multivibrators, each connected to the output of its corresponding electron tube, and a plurality of amplifiers and differentiating circuits, one of each for each successive pair of said multivibrators, the input of each amplifier being connected through the corresponding differentiating circuit to the output of its corresponding multivibrator and directly to the output of another succeeding multivibrator, whereby only one of said plurality of amplifiers provides an output for an input pulse of specific duration.

15. In apparatus of the class described the combination of an integrator for converting input pulses of different durations into saw-tooth pulses having peak amplitudes of commensurate magnitude, a series of electron tubes having their inputs connected in parallel to said integrator, each of said electron tubes being so biased that it will conduct only for that portion of a saw-tooth pulse applied to its input which exceeds a predetermined value and each of said electron tubes being differently biased, a corresponding plurality of multivibrators, each connected to the output of its corresponding electron tube, and a plurality of output circuits, one for and connected to each pair of said multivibrators and responsive to the output of the second of its associated multivibrators to render ineffective any simultaneous output of the first of its associated multivibrators, whereby an output is produced from a different one of each of said output circuits in response to input pulses of respectively different specific durations.

16. In apparatus of the class described the combination of an integrator for converting pulses of different durations into corresponding pulses whose amplitudes are a measure of said durations and a plurality of cooperating amplitude discriminators connected in parallel to the output of said integrator and responsive to said corresponding pulses, each successive amplitude discriminator being responsive only to pulses of greater amplitude than that to which the next preceding amplitude discriminator is responsive, each amplitude discriminator but the last including in circuit therewith a delay circuit timed to delay its output a time at least equal to the time at which the next amplitude discriminator would be rendered responsive if the input pulse were of sufficient duration, and each successive amplitude discriminator including a control for disabling each preceding amplitude discriminator on receipt of a pulse to which it is responsive, whereby only one amplitude discriminator will produce an output for a single pulse applied simultaneously to said plurality of amplitude discriminators in parallel.

17. In apparatus of the class described the combination of an integrator for converting pulses of different durations into corresponding saw-tooth pulses whose amplitudes are a measure of said durations and a plurality of cooperating amplitude discriminators connected in parallel to the output of said integrator and responsive to said corresponding pulses, each successive amplitude discriminator being responsive only to a pulse of greater amplitude than that to which the next preceding amplitude discriminator is responsive, each amplitude discriminator but the last including in circuit therewith a delay circuit timed to delay its output a time at least equal to the time at which the next amplitude discriminator would be rendered responsive if the input pulse were of sufficient duration, and each successive amplitude discriminator including an output control for disabling the preceding amplitude discriminator on receipt of a pulse to which it is responsive, whereby only one amplitude discriminator will become effective when a single pulse is simultaneously applied to said plurality of amplitude discriminators in parallel.

18. In apparatus of the class described the combination of a linear pulse integrator for converting input pulses of different durations into saw-tooth pulses of peak amplitude commensurate with said durations, a series of electron tubes having their inputs connected in parallel to the output of said integrator, each successive one of said series of electron tubes being biased to a greater extent than the next preceding tube so that when suitable supply potentials are applied thereto each succeeding tube will start conducting at a predetermined amplitude of a saw-tooth pulse applied to its input, which amplitude for each succeeding tube is greater than that for any preceding tube, a corresponding plurality of amplifiers and control circuits, each amplifier being connected through the corresponding control circuit to its corresponding electron tube and also connected to and responsive to the output of the control circuit of the next successive electron tube to render ineffective any simultaneous output of its own control circuit, and each control circuit including in circuit therewith a delay circuit timed to introduce a time delay at least equal to the additional time required for the next successive biased electron tube to start conducting due to the same input pulse if said input pulse is of sufficient duration, whereby only one amplifier will become effective when a single saw-tooth pulse is simultaneously applied to the inputs of said electron tubes.

LIONEL H. ORPIN.

REFERENCES CITED

The following references are of record in the file of this patent:

UNITED STATES PATENTS

| Number | Name | Date |
|---|---|---|
| 2,158,285 | Koch | May 16, 1939 |
| 2,275,930 | Torcheux | Mar. 10, 1942 |
| 2,281,934 | Geiger | May 5, 1942 |
| 2,282,046 | Goldsmith | May 5, 1942 |
| 2,340,213 | Ellsworth | Jan. 25, 1944 |
| 2,359,447 | Seeley | Oct. 3, 1944 |
| 2,392,546 | Petersen | Jan. 8, 1946 |
| 2,399,668 | Francis | May 7, 1946 |
| 2,413,440 | Farrington | Dec. 31, 1946 |
| 2,419,548 | Greig | Apr. 29, 1947 |
| 2,425,066 | Labin | Aug. 5, 1947 |
| 2,425,314 | Hansell | Aug. 12, 1947 |
| 2,425,316 | Dow | Aug. 12, 1947 |
| 2,453,454 | Norwine | Nov. 9, 1948 |